Jan. 15, 1935.  W. O. BURROWS  1,987,924
APPARATUS FOR MAKING METAL INLAYS
Filed March 14, 1932  3 Sheets-Sheet 1
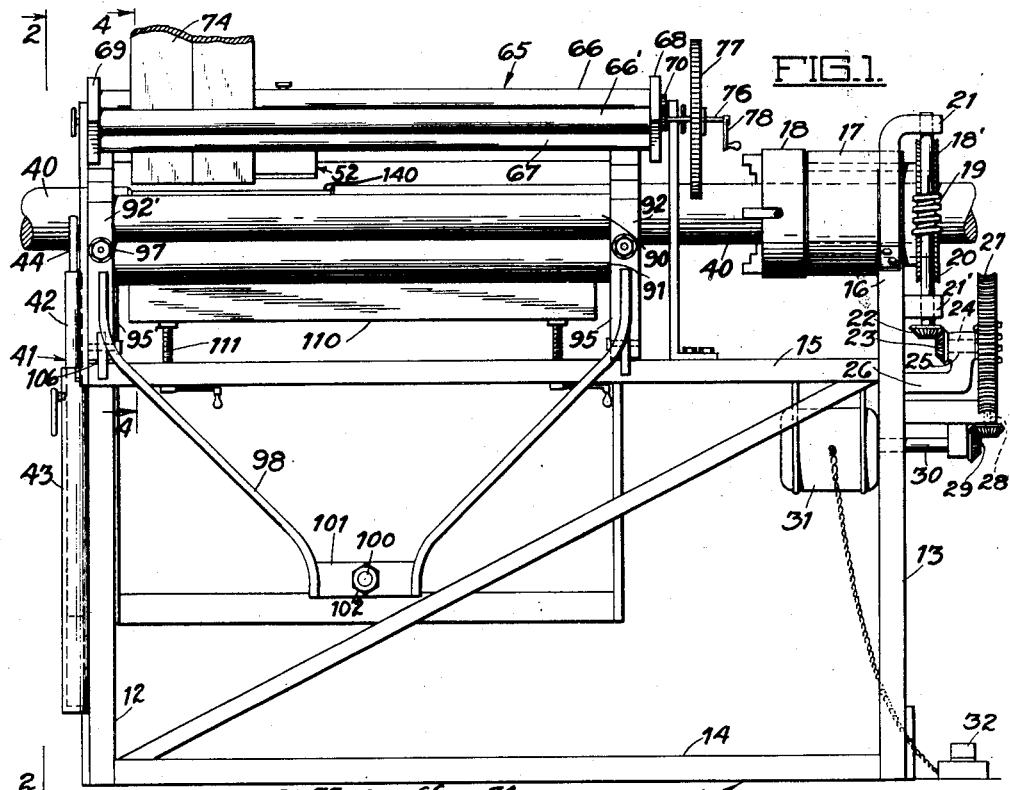
FIG. 1.
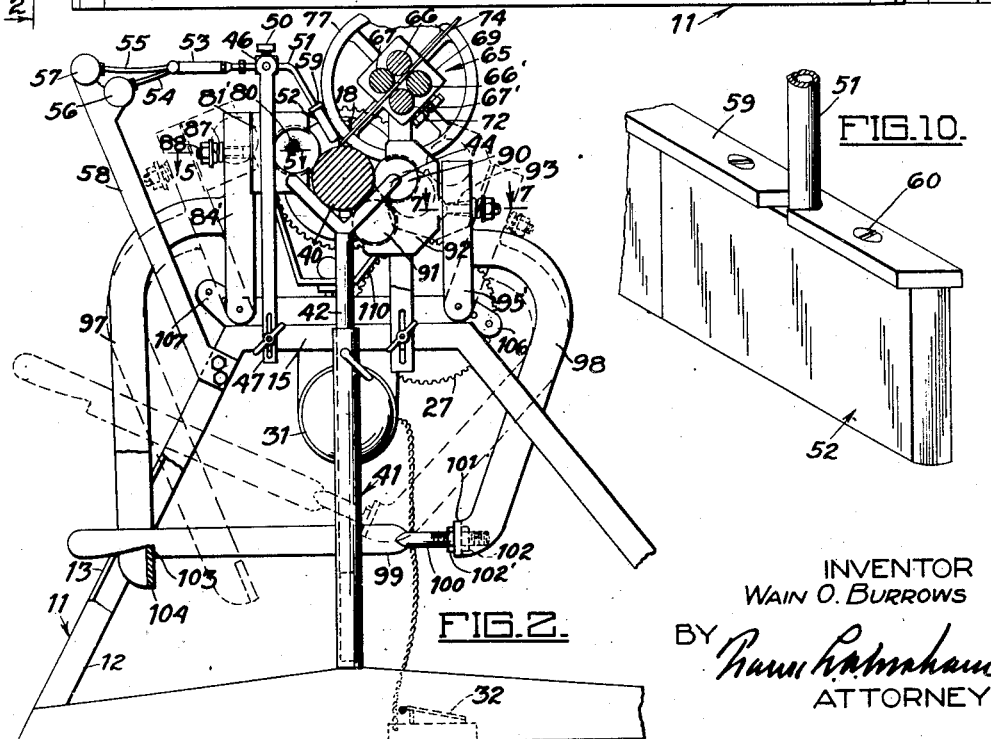
FIG. 2.
FIG. 10.
INVENTOR
WAIN O. BURROWS
BY
ATTORNEY Jan. 15, 1935.  W. O. BURROWS  1,987,924
APPARATUS FOR MAKING METAL INLAYS
Filed March 14, 1932  3 Sheets-Sheet 2
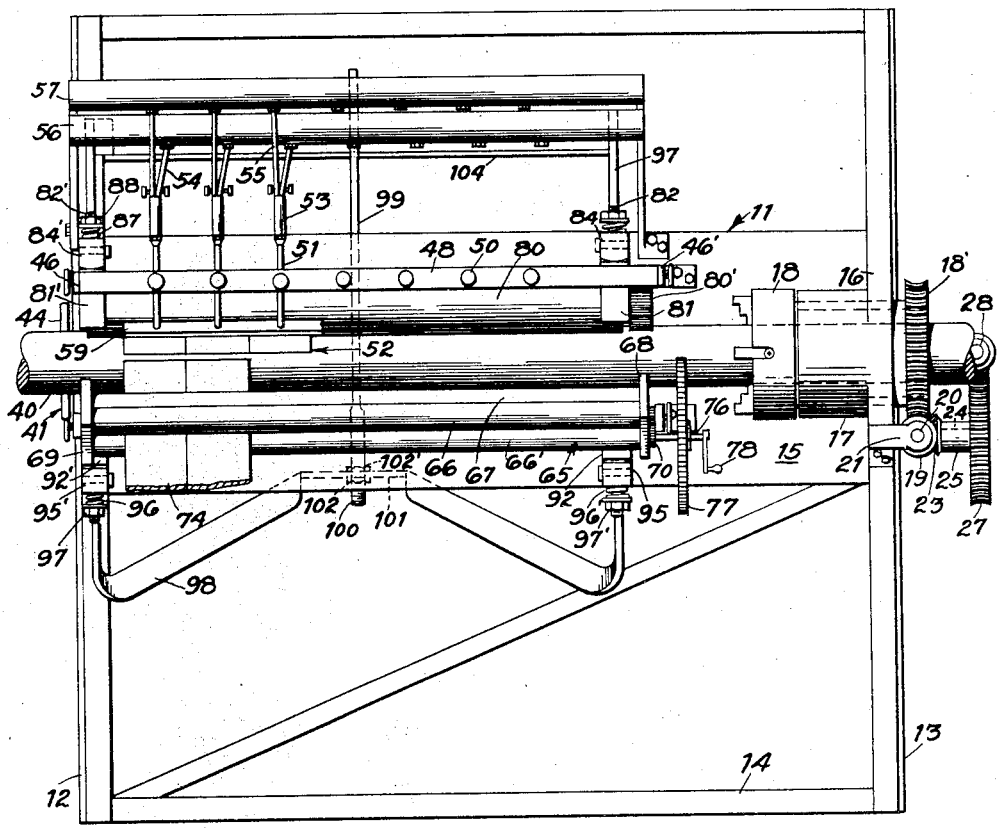
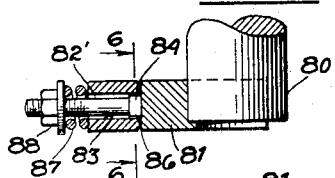
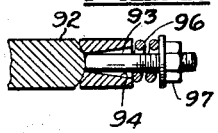
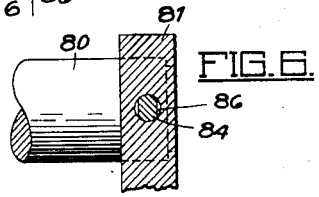
INVENTOR
WAIN O. BURROWS
BY
ATTORNEY

INVENTOR
WAIN O. BURROWS
ATTORNEY

Patented Jan. 15, 1935

1,987,924

UNITED STATES PATENT OFFICE 1,987,924

APPARATUS FOR MAKING METAL INLAYS

Wain O. Burrows, Huntington Park, Calif., assignor to Burco Engineering and Manufacturing Co., a corporation of California Application March 14, 1932, Serial No. 598,642

7 Claims. (Cl. 29—33)

This invention has to do in a general way with the art of making metallic inlays, and is more particularly related to a novel method and apparatus for placing inlays of this nature on curved surfaces, such as cylindrical members.

In addition to the method and apparatus, my invention contemplates a novel type of piston rod which is preferably formed by the method contemplated by this invention.

I have found in the usual type of piston rod, such as is used in pumps, that many of the fluids which are pumped tend to work with the piston rod through the packing, and if the material contains any sediment, it soon wears the rod to such an extent that it must be repacked and, in many instances, the rod must be replaced.

In the construction of pumps and the like, the piston rod must, in view of its particular function, be composed of a material having a high compressive strength, but the effective life of the rod is governed largely by the surface hardness. It is, therefore, highly desirable to have a piston rod with a high compressive strength which, at the same time, has an extremely hard wearing surface adapted to slide through the packing.

It is well known to those familiar with the art that the hardness of steel rods may be varied within certain limits by heat treatment, but it is also a fact that a heat treatment to get maximum hardness has a deleterious effect upon the strength of the rod. I have, therefore, conceived the idea of using a steel or other metallic rod which is heat treated to give it the maximum strength for the particular work the rod is to perform, and have inlaid upon the surface of such rod a bearing material of extreme hardness. This material may, if desired, be inlaid throughout the entire length of the rod, but I prefer to inlay it only on that portion which is subjected to bearing or wearing action, reducing the diameter of the member in the region which is to receive the inlay.

Although the method and apparatus contemplated in this invention were developed particularly for use with the piston rod described above, I have found that they are adapted to many other uses, for example, the method contemplated by this invention is not confined to placing inlays in the exterior surface of a rod or shaft, but may also be employed for lining the interior of cylindrical shells which might be used in ball mills and the like.

It is one object of this invention to produce a method and apparatus of the class described which can be used to form inlays of any desired length or thickness on either the exterior or interior of a cylindrical member.

The method contemplated by this invention consists in a general way of laying a molten "sheet" of inlay metal on a cylindrical surface. In this connection, I have found that it is extremely important to maintain the member on which the inlay is being formed at a high temperature during the placement of the inlay, and that the temperature of the member should be sufficient to compensate for the contraction of the inlay metal when it is cooled.

I have also found that the inlay metal, as it is flowed onto the surface of the cylindrical object, has a tendency to form blow holes which reduce its wearing qualities. It therefore becomes a further object of this invention to produce a method and apparatus in which means are provided for compressing the metal as it is inlaid to form a substantially uniform surface, and to positively eliminate the possibility of any blow holes forming in the inlay itself.

It is a noteworthy feature of the machine contemplated by this invention that the machine can be used to press inlays on the surface of shafts of any length. The general construction of the machine comprises a frame having a rotatable chuck adapted to receive and support a shaft or rod to be inlaid. The frame is also provided with a burner support whereby any number of burners can be mounted in alignment above the shaft so as to project a flame onto the region of the shaft which is to receive the inlay. A feed mechanism is provided on the frame, such mechanism being adapted to feed the inlay metal into the flame. I also provide an adjustable pressure roll arranged so as to engage and press the hot metal onto the shaft immediately after it has been laid thereon by the flame.

In addition to the mechanism outlined above, I provide the frame with a heater designed to hold the shaft at a uniform temperature while the inlay is being formed. I have found in the practice of my invention that the oxygen-acetylene flame is especially adapted for use in forming an inlay of this nature, and, in this connection, I have designed a novel type of burner tip which is constructed so as to project a series of minute flame jets in substantial alignment. The tips are also constructed so that any desired number of them may be arranged in line with each other to project a flame of the class described of any desired length.

In this connection, it is a further object of this invention to produce a burner of the class described which is self cooling.

The details in the construction of a preferred form of my invention, together with other objects attending its production, will be best understood from the following description of my accompanying drawings, which are shown for illustrative purposes only, and in which—

Fig. 1 is a side elevation, showing a preferred type of machine contemplated by this invention;

Fig. 2 is an end elevation which may be considered as having been taken in a plane represented by the line 2—2 of Fig. 1;

Fig. 3 is a plan view of the machine, as shown in Fig. 1;

Fig. 5 is a fragmentary plan section taken in a plane represented by the line 5—5 in Fig. 2 and shows a preferred manner of mounting the pressure roll contemplated by this invention;

Fig. 6 is a sectional view taken in a plane represented by the line 6—6 of Fig. 5;

Fig. 7 is another fragmentary section taken in a plane represented by the line 7—7 in Fig. 2, and illustrates the manner of mounting another pressure roll support in the machine contemplated by this invention;

Fig. 10 is a perspective view showing the burner tip construction in the manner in which these tips are supported in alignment;

Figure 4:
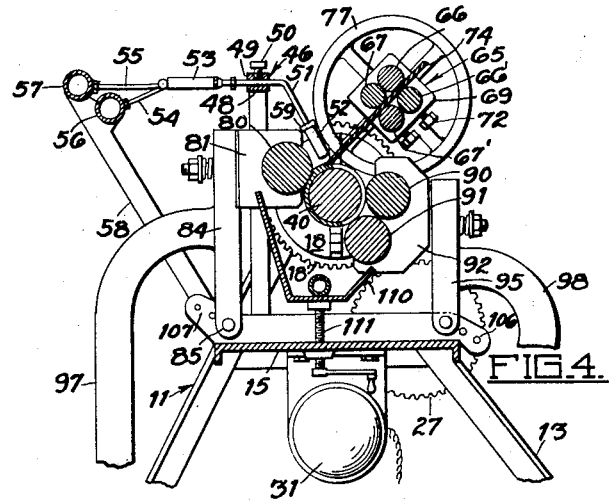
Fig. 4 is a fragmentary section taken in a plane represented by the line 4—4 of Fig. 1.

More particularly describing the invention herein illustrated, 11 indicates a frame comprising end members 12 and 13, which are braced at their lower ends by a base member 14 and which support a plate or table member 15 at their upper end portions. The end member 13 is extended upwardly beyond the plate 15, as indicated at 16, to provide a support for a sleeve 17 which engages a chuck or other receiving member, as indicated at 18. The chuck is rotatably supported in the sleeve 17, and its rearwardly extending end is provided with a worm gear 18' which engages a worm 19 mounted on a shaft 20 which is supported between suitable bearings 21 and 21'. The lower end of the shaft 20 engages a miter gear 22 which engages another miter gear 23 mounted on a shaft 24 which extends through a hub 25 supported by a bracket 26. The outer end of the shaft 24 engages another worm gear 27 which engages a worm similar to the worm 19 and is mounted on the upper end portion of a shaft 28. The shaft 28 is driven through a pair of gears 29 and a shaft 30 from a variable speed motor 31, the speed of which is controlled by a pedal 32. In this connection, it is to be understood that various means may be employed for rotating the chuck and so far as my invention is concerned, the chuck might be manually operable, although I consider it preferable to employ the motor drive with the variable speed control.

Reference numeral 40 indicates a shaft or piston rod which has one end secured in the chuck 18, and has its other end supported by an adjustable support 41, which is shown as comprising a rod 42 adjustably mounted in a sleeve 43 secured to the end 12 of the frame structure. The upper end of the rod 42 is provided with a fork 44 designed to support the shaft.

Reference numerals 46 and 46' indicate a pair of upright standards which have their lower end portions adjustably secured to the frame, as indicated at 47, and are provided with bearings 47' at their upper ends designed to support a transverse bar 48, which I will hereinafter refer to as a burner support. This bar is provided with a series of spaced passages 49, associated with set screws 50, through which a stem or conduit 51 is inserted and adapted to be held in place. The conduit 51 is bent or curved, as indicated in Figs. 2 and 4, and carries on its lower end a burner tip or head 52. The other end of the conduit 51 is connected with the conventional type of mixing chamber 53, such as are ordinarily used in the projection of oxygen acetylene flame, and this chamber is connected through conduits 54 and 55 with manifolds 56 and 57 respectively which are supported in any suitable manner such as by means of a pair of oppositely disposed standards 58. The manifolds 56 and 57 are of course connected with any suitable sources of oxygen and acetylene not shown.

As also pointed out above, the burner tips are designed so that they can be arranged in a battery of any length, and it is important that they be supported with the lower edges which have the outlet ports therein in substantial alignment. This is accomplished by mounting the upper faces of the burner heads or tips on an aligning bar 59 which is secured to each burner head as by means of screws 60 (Fig. 10).

Figures 8, 9, 13:
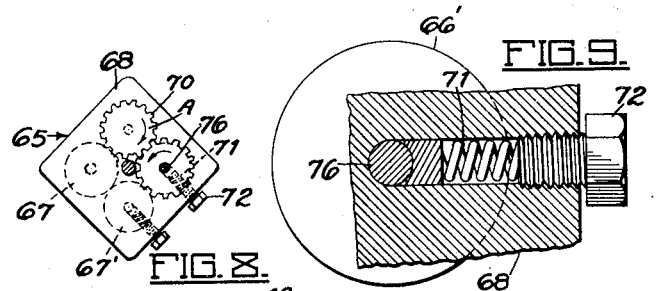
Fig. 8 is an elevational view illustrating the construction of a preferred form of feed mechanism contemplated by this invention.
Fig. 9 is an enlarged sectional view illustrating the manner of mounting the feed rolls in the feed roll supporting plate.
Fig. 13 illustrates a piston rod of the type contemplated by this invention.

Reference numeral 65 indicates a feed mechanism which is shown as comprising a plurality of rolls 66 and 66' and 67 and 67' mounted between plates 68 and 69. As shown in Fig. 8, the rolls 66 and 66' are geared together by means of gears 70 and the rolls 66' and 67' are both pressed toward their corresponding rolls 66 and 67 by means of springs 71 associated with screw members 72.

Reference numeral 74 indicates a plate, a sheet or a bar of inlay metal, which is passed between the said rolls and is fed into the flame or flames projected from the burner head or tip 52 by driving the said rolls in the general direction indicated by the arrow A in Fig. 8. The said rolls may be driven by extending a shaft 76 from one of the rolls and either providing the shaft with a knurled disk 77 adapted to engage the shaft 40, or with a crank 78 which may be manually operated to feed the material into the flame at the desired rate.

As pointed out above, the inlay metal may be in the form of a sheet or plate, or it may be in the form of rods, but I think it preferable, as in a machine of this nature, to make the inlay metal in the form of plates which are substantially the same width as the burner heads, and as the machine is operating, additional plates may be "tacked" onto the outer ends of the plates in use by the conventional welding process. In this connection it will be understood that the composition of the inlay metal may be varied to suit the particular conditions to which the inlay is to be subjected. I have found for the wearing or bearing surface of piston rods of the nature discussed above, that the metal should have a hardness of 58 Rockwell C or greater and have used, as such a metal, an alloy composed of iron tungsten, chromium, nickel, and carbon proportioned so as to give the desired hardness.

From the construction described so far, it will be seen that, as the shaft 40 is rotated, the flame from the burner tips will deposit a sheet of molten inlay metal onto the shaft and that the thickness of such inlay can be governed by the speed of rotation of the shaft. By operating the said mechanism directly from the shaft, I am able to feed the material into the flame at a speed which is commensurate with the speed of shaft rotation.

As was pointed out earlier in the specification, it is highly desirable in forming an inlay of this nature, to press the inlay material onto the shaft while it is still in a semi-molten condition. This produces a product which is uniform both in quality and in texture, and, to accomplish this, I provide what may be termed an initial pressure roll 80 which has its two end portions mounted in roll supporting heads 81 and 81'. The roll 80 is provided with a knurled extension 80' adapted to engage the shaft 40, thereby driving the roll at the same linear velocity at which the shaft is rotated. The heads 81 and 81' are both provided with pins 82 and 82', which extend through apertures 83 in the upper ends of lever arms 84 and 84' which are pivotally mounted on the frame, as indicated at 85. The pins 82 and 82' are made smaller than the passages through the upper ends of the lever arms, and a boss 84 is provided on the base of each pin, such boss being of reduced thickness at its two sides, as shown at 86 in Fig. 6, so as to permit a slight sidewise movement of the roll supporting heads 81 and 81'. The outer ends of the pins are provided with springs 87 and nuts 88. From this construction, it will be seen that any differences in diameter of the portion of the shaft against which the roll is bearing (which may be caused by laying an inlay in a small portion only on one end of the shaft) will be compensated for by the shifting of the pressure roll.

As a means for applying additional pressure to the inlay, and to assist in holding the shaft in proper alignment against the action of the pressure roll 80, I provide a pair of secondary pressure rolls 90 and 91 which are arranged so as to engage the side of the shaft opposite the roll 80. The rolls 90 and 91 are mounted between roll supporting heads 92 and 92', such heads being provided with rearwardly extending studs or pins 93 which extend through the flared passages 94 in the upper ends of lever arms 95 and 95'. These pins have their outer ends provided with springs 96 and 96' and nuts 97 and 97', and the construction employed here is similar to that employed in connection with the roll 80 in that the rolls 90 and 91 are arranged so that they may shift slightly with respect to the shaft 40.

As a means for pressing the rolls 80 and the rolls 90 and 91 toward each other, I connect the pair of arms 84 and 84' together by means of a U-shaped brace member 97, and I similarly connect the arms 95 and 95' with a brace member 98. These brace members extend downwardly so that their lower ends are situated a substantial distance below the table 15, and one of the brace members (98) is provided with an arm 99 which has a pin 100 extending through an aperture in a horizontal member 101 formed on the lower end of the brace member 98.

The pin 100 is provided with a pair of spaced nuts 102 and 102' for adjusting the effective length of the arm 99. The other end of the arm 99 is provided with a notch 103 adapted to extend over a horizontal member 104 on the lower end of the arm 97. The member 104 is made of a somewhat resilient material, such as spring steel, so that when the arm member 99 with the notch placed over the bar 104 is swung transversely along the bar 104, it will force the two levers 84 and 95 toward each other and into pressure engagement with the shaft 40.

The plate or table member 15 is provided on its end with a pair of oppositely extending ears, indicated in Figs. 2 and 4 by reference numerals 106 and 107. These ears are provided with apertures so that the two lever members can be adjusted to accommodate shafts of various diameters.

Reference numeral 110 indicates a heater which is adjustably mounted in the plate 15 by means of screws indicated at 111. This heater is designed to maintain the shaft 40 at a uniform temperature during the inlay process.

Figure 11:
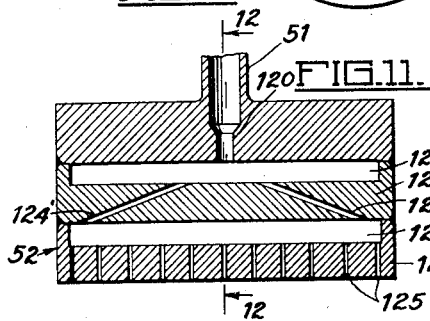
Fig. 11 is a sectional view illustrating the construction of the burner tip.
Figure 12:
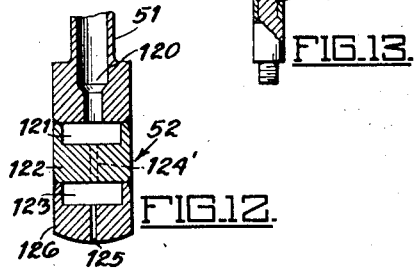
Fig. 12 is a section taken on a plane represented by the line 12—12 in Fig. 11.

The details of the construction of the burner head or tip 52 is best illustrated in Figs. 11 and 12, where the burner head is shown as comprising a box like housing having an inlet passage 120 which leads from the conduit 51 into what may be termed a primary expansion chamber 121. In this connection, it will be observed from Figs. 11 and 12, that the chambered portion of the burner housing is divided by a partition 122 into the primary expansion chamber 121 and a secondary expansion chamber 123. These two chambers are connected by passages 124 and 124' which lead from the mid-portion of the primary chamber to the two edges of the secondary expansion chamber. The housing is also provided with a plurality of minute outlet ports 125 which communicate with the secondary expansion chamber.

In the operation of the burner, the mixture of oxygen and acetylene under pressure enters the primary chamber 121 where they expand, and, by virtue of such expansion, are cooled to a certain extent. The expanded gases then pass through the primary expansion chamber, through the passages 124 and 124' into the secondary expansion chamber where they again expand and are further cooled. It will be seen, therefore, that this construction, in addition to giving a uniform distribution of mixed gases throughout the entire length of the outlet orifice plate 126, which carries the outlet ports 125, provides a burner head which is self-cooling. This is an extremely important feature in a machine of this character.

Figure 14:
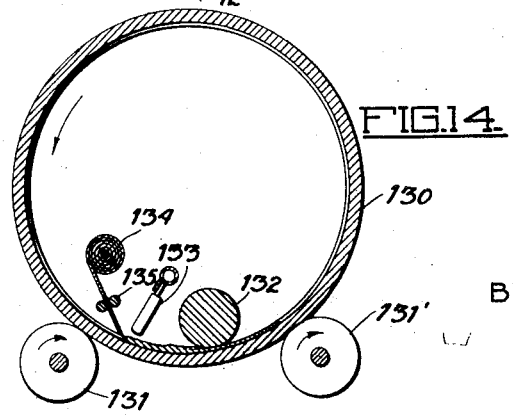
Fig. 14 illustrates the manner in which the method contemplated by this invention may be practiced by placing an inlay on the interior of a cylindrical shell.

In the modification shown in Fig. 14, I illustrate a device whereby the same method contemplated in connection with the machine shown and described above may be employed for placing an inlay on the interior surface of a shell 130. In a device of this character, the shell is suspended on a pair of oppositely disposed rollers indicated at 131 and 131' which are adapted to be driven in any suitable manner so as to revolve the shell. A pressure roller 132 is positioned within a shell immediately behind a bank of burner tips or heads, indicated generally by reference numeral 133, and the inlay metal is fed from a roll or magazine, generally indicated at 134, through a set of feed rolls 135 into the flame projected from the burner tip.

In the method contemplated by this invention, I prefer to take the shaft, piston rod, or other member which is to receive an inlay, and reduce its diameter by means of a lathe or other suitable machine to a depth of one-eighth of an inch in the region which is to receive the inlay as indicated at 140 (Figs. 1 and 13). The member prepared in this manner is then heated to a dull red heat and placed in the machine where this temperature is maintained by means of heater 110. The burner heads are then turned on and ignited and the rotation of the shaft is started which automatically starts the feeding of the inlay metal. After the inlay metal is melted and laid on the shaft, it is rolled while in a soft or plastic condition by the pressure rolls, and a complete inlay is formed during one rotation of the shaft. The shaft is then removed and slow-cooled in an oven, or by burying it in a suitable non-conductive material. After it has been cooled, it is ready to be machined or ground down to size. In this connection, it will be understood that by virtue of the pressure rolls, very little machining is required to obtain a finished surface of the required diameter.

In Fig. 13, I show at 130 a piston rod which is provided with an inlaid bearing section 131. This section extends through the entire length of that portion of the piston rod which works through the packing of the pump.

It will be apparent from the foregoing description that I have produced a novel method and apparatus for making a new and useful article of commerce and that, while I have herein described and illustrated certain preferred embodiments of my invention, the invention is not limited to the precise construction described above, but includes within its scope whatever changes fairly come within the spirit of the appended claims.

I claim as my invention:

1. A machine for inlaying bearing metal on shafts and the like embodying: a frame; a chuck rotatably mounted in said frame and adapted to receive a shaft to be inlaid; a burner support mounted in said frame; a plurality of aligned burners mounted in said burner support and arranged to project a flame onto said shaft; means for revolving said chuck; and means for feeding inlay metal into said flame, said last mentioned means comprising a plurality of feed rolls mounted in said frame and spaced apart for the passage of said inlay metal and means for driving said feed rolls.

2. A machine for inlaying bearing metal on shafts and the like embodying: a frame; a chuck rotatably mounted in said frame and adapted to receive a shaft to be inlaid, a burner support mounted in said frame; a plurality of aligned burners mounted in said burner support and arranged to project a flame onto said shaft; means for revolving said chuck; and means for feeding inlay metal into said flame, said last mentioned means comprising a plurality of feed rolls mounted in said frame and spaced apart for the passage of said inlay metal, and means operated from said shaft for driving said feed rolls.

3. A machine for inlaying metal on shafts and the like embodying: a frame; means for rotatably supporting a shaft in said frame; burner means mounted in said frame and arranged to project a flame onto said shaft; means for feeding inlay metal into said flame; and pressure rollers mounted in said frame and adapted to engage opposite sides of said shaft.

4. A machine for inlaying metal on shafts and the like embodying: a frame; means for rotatably supporting a shaft in said frame; burner means mounted in said frame and arranged to project a flame onto said shaft; means for feeding inlay metal into said flame; pressure rollers mounted in said frame on opposite sides of said shaft; and adjustable means for swinging said rollers into pressure engagement with said shaft.

5. A machine for inlaying metal on shafts and the like embodying: a frame; means for rotatably supporting a shaft in said frame; burner means mounted in said frame and arranged to project a flame onto said shaft; means for feeding inlay metal into said flame; and a pressure roller mounted in said frame in pressure engagement with said shaft, said pressure roller having a knurled end portion engaging said shaft.

6. A machine for inlaying metal on shafts and the like embodying: a frame; means for rotatably supporting a shaft in said frame; burner means mounted in said frame and arranged to project a flame onto said shaft; means for feeding inlay metal into said flame; a pair of oppositely disposed roll supporting arms pivotally mounted in said frame; a pressure roll yieldably mounted on said arms in substantial alignment with said shaft; and means associated with said arms for holding said roll in pressure engagement with said shaft.

7. A machine for inlaying metal on shafts and the like embodying: a frame; means for rotatably supporting a shaft in said frame; a burner mounted in said frame and adapted to project a flame onto said shaft, said burner comprising an elongated housing having an inlet communicating with a primary expansion chamber, a secondary expansion chamber, passages connecting the primary and secondary expansion chamber, and a plurality of outlet passages in said secondary expansion chamber; and means for feeding inlay metal into the region in front of said outlet passages.

WAIN O. BURROWS.